US010629173B2

(12) United States Patent
Yoshino

(10) Patent No.: US 10,629,173 B2
(45) Date of Patent: Apr. 21, 2020

(54) MUSICAL PIECE DEVELOPMENT ANALYSIS DEVICE, MUSICAL PIECE DEVELOPMENT ANALYSIS METHOD AND MUSICAL PIECE DEVELOPMENT ANALYSIS PROGRAM

(71) Applicant: Pioneer DJ CORPORATION, Yokohama-shi, Kanagawa (JP)

(72) Inventor: Hajime Yoshino, Yokohama (JP)

(73) Assignee: Pioneer DJ Coporation, Yokohama-shi (JP)

( * ) Notice: Subject to any disclaimer, the term of this patent is extended or adjusted under 35 U.S.C. 154(b) by 0 days.

(21) Appl. No.: 16/087,688

(22) PCT Filed: Mar. 30, 2016

(86) PCT No.: PCT/JP2016/060461

§ 371 (c)(1),
(2) Date: Sep. 24, 2018

(87) PCT Pub. No.: WO2017/168644

PCT Pub. Date: Oct. 5, 2017

(65) Prior Publication Data

US 2019/0115000 A1 Apr. 18, 2019

(51) Int. Cl.
*G10H 1/00* (2006.01)
*G10G 3/04* (2006.01)
(Continued)

(52) U.S. Cl.
CPC ............. *G10G 3/04* (2013.01); *G10H 1/0008* (2013.01); *G10H 1/40* (2013.01); (Continued)

(58) Field of Classification Search
CPC .................................................... G10H 1/0008
See application file for complete search history.

(56) References Cited

U.S. PATENT DOCUMENTS 7,179,982 B2 * 2/2007 Goto ........................ G10D 1/00 348/465
7,491,878 B2 * 2/2009 Orr ...................... G10H 1/0025 84/609

(Continued)

FOREIGN PATENT DOCUMENTS

JP 2004-233965 A 8/2004
JP 2010-054802 A 3/2010

(Continued)

OTHER PUBLICATIONS

English translation of International Preliminary Report on Patentability dated Oct. 2, 2018 (Oct. 2, 2018), Applidation No. PCT/JP2016/060461, 6 pages.

(Continued)

*Primary Examiner* — Robert W Horn
(74) *Attorney, Agent, or Firm* — Rankin, Hill & Clark LLP

(57) ABSTRACT

A music piece development analyzer includes: a comparison target sound detector configured to detect a sound production position of a comparison target sound in a form of a sound of a predetermined musical instrument from music piece data; a sound production pattern comparing unit configured to set at least two comparison sections each having a predetermined length in the music piece data, compare the at least two comparison sections in terms of a sound production pattern of the comparison target sound, and detect a similarity degree of the sound production pattern between the at least two comparison sections, and a development change-point determining unit configured to determine a development change-point of the music piece data based on the similarity degree.

11 Claims, 9 Drawing Sheets

(51) Int. Cl.
*G10H 1/40* (2006.01)
*G10L 25/51* (2013.01)

(52) U.S. Cl.
CPC . *G10H 2210/056* (2013.01); *G10H 2210/061* (2013.01); *G10H 2210/071* (2013.01); *G10H 2210/076* (2013.01); *G10H 2210/091* (2013.01); *G10H 2240/141* (2013.01); *G10H 2250/135* (2013.01); *G10L 25/51* (2013.01)

(56) References Cited

U.S. PATENT DOCUMENTS

| | | | | |
|---|---|---|---|---|
| 7,790,974 | B2 * | 9/2010 | Sherwani | G10H 1/0025 84/609 |
| 9,024,169 | B2 * | 5/2015 | Sumi | G10H 1/0008 84/616 |
| 9,099,064 | B2 * | 8/2015 | Sheffer | G10H 1/36 |
| 9,208,821 | B2 * | 12/2015 | Evans | G10H 1/0025 |
| 9,542,917 | B2 * | 1/2017 | Sheffer | G10H 1/36 |
| 9,613,605 | B2 * | 4/2017 | Brewer | G10H 1/0008 |
| 9,959,851 | B1 * | 5/2018 | Fernandez | G10H 1/0066 |
| 10,127,943 | B1 * | 11/2018 | Patry | H04N 5/76 |
| 10,262,639 | B1 * | 4/2019 | Girardot | G10H 1/0008 |
| 10,284,809 | B1 * | 5/2019 | Noel | H04N 5/9305 |
| 10,366,121 | B2 * | 7/2019 | Douglas | G10H 1/0008 |
| 2005/0241465 | A1 * | 11/2005 | Goto | G10D 1/00 84/616 |
| 2011/0093798 | A1 * | 4/2011 | Shahraray | G11B 27/034 715/763 |
| 2012/0014673 | A1 * | 1/2012 | O'Dwyer | G06F 3/0346 386/282 |
| 2013/0275421 | A1 * | 10/2013 | Resch | G10H 1/0008 707/725 |
| 2013/0287214 | A1 * | 10/2013 | Resch | G10H 1/0008 381/56 |
| 2015/0094835 | A1 * | 4/2015 | Eronen | G06F 3/165 700/94 |
| 2016/0125859 | A1 * | 5/2016 | Eronen | G10L 25/51 700/94 |
| 2017/0371961 | A1 * | 12/2017 | Douglas | G10H 1/0008 |
| 2019/0115000 | A1 * | 4/2019 | Yoshino | G10G 3/04 |
| 2019/0200432 | A1 * | 6/2019 | Kawano | H05B 37/02 |
| 2019/0237050 | A1 * | 8/2019 | Girardot | G10H 1/0008 |

FOREIGN PATENT DOCUMENTS

| | | | |
|---|---|---|---|
| JP | 2010-97084 | A | 4/2010 |
| JP | 4775380 | B2 | 9/2011 |

OTHER PUBLICATIONS

Hirokazu Kameoka, et al. "Ongaku Joho Shori Gijutsu-Bunseki kara Gosei-Sakkyoku-Rikatsuyo made-", (Recent Advance in Music Signal Processing Techniques),The Journal of the Institute of Electronics, Information and Communication Engineers, vol. 98, No. 6, Jun. 1, 2015, p. 472, with English Translation, Cited in International Search Report, 10 pages.
Eiji Hirasawa, "Jissen & Shinan! "Mimi Kopi" Drill Dai 2 Kai", (Practice & Advice! "Music Dictation" Drills),DTM Magazine, vol. 16, No. 2, Feb. 1, 2009, p. 44, with English Translation, Cited in International Search Report, 5 pages.
Emiru Tsunoo, "Rhythm Map: Extraction of Unit Rhythmic Patterns and Analysis of Rhythmic Structure from Music Acoustic Signals", IPSJ SIG Technical Reports, vol. 2008, No. 78, Jul. 30, 2008, pp. 149-154, with English Translation, Cited in International Search Report, 10 pages.
International Search Report dated Jun. 14, 2016, PCT/JP2016/060461, 2 pages.

* cited by examiner

FIG. 9

VERSE

| n | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Q(n) | | | | | | | | | 0.98 | 0.99 | 0.99 | | 0.99 | 0.99 | 0.98 | |

VERSE

| n | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| Q(n) | 0.98 | 0.99 | 0.99 | | 0.99 | 0.99 | 0.98 | | 0.98 | 0.99 | 0.99 | | 0.97 | 0.96 | 0.93 | |

PRE-CHORUS

| n | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| Q(n) | <u>0.89</u> | 0.91 | 0.93 | | 0.96 | 0.97 | 0.98 | | 0.98 | 0.99 | 0.99 | | 0.96 | 0.96 | 0.93 | |

P(1)=33

VERSE

| n | 49 | 50 | 51 | 52 | 53 | 54 | 55 | 56 | 57 | 58 | 59 | 60 | 61 | 62 | 63 | 64 |
|---|---|---|---|---|---|---|---|---|---|---|---|---|---|---|---|---|
| Q(n) | <u>0.89</u> | 0.91 | 0.93 | | 0.96 | 0.97 | 0.98 | | 0.98 | 0.99 | 0.99 | | 0.97 | 0.96 | 0.93 | |

P(2)=49

VERSE

| n | 65 | 66 | 67 | 68 | 69 | 70 | 71 | 72 | 73 | 74 | 75 | 76 | 77 | 78 | 79 | 80 |
|---|---|---|---|---|---|---|---|---|---|---|---|---|---|---|---|---|
| Q(n) | 0.98 | 0.99 | 0.99 | | 0.97 | 0.96 | 0.93 | | 0.98 | 0.99 | 0.99 | | 0.97 | 0.96 | 0.93 | |

MUSICAL PIECE DEVELOPMENT ANALYSIS DEVICE, MUSICAL PIECE DEVELOPMENT ANALYSIS METHOD AND MUSICAL PIECE DEVELOPMENT ANALYSIS PROGRAM

TECHNICAL FIELD

The present invention relates to a music piece development analyzer, a music piece development analysis method, and a music piece development analysis program.

BACKGROUND ART

There has typically been known a music piece analysis technique of automatically analyzing information of a music piece from its music piece data. The music piece analysis technique is exemplified by a technique of detecting beats from music piece data (see Patent Literature 1), in which BPM (Beats Per Minute) and tempos can be calculated. Moreover, a technique of automatically analyzing keys, codes and the like has been developed.

On a typical DJ performance, a DJ (Disk Jockey) manually sets a cue point (i.e., connection point) and a mixing point. With use of such music piece information, an operation such as connecting a music piece to a next one without providing a feeling of discomfort can be suitably performed.

Such a music piece analysis technique is applied to a music piece reproduction device such as a DJ system and is also provided as software to be run on a computer for reproducing or processing a music piece.

As another example of the music piece analysis technique of automatically analyzing music piece data, there has been known an audio segmentation technique of pinpointing a beginning time and an ending time of a segment of a music piece to allow grouping of the segments or extracting of the segment(s), using an advanced similarity judging function (see Patent Literature 2).

CITATION LIST

Patent Literature(s)

Patent Literature 1: JP 2010-97084 A
Patent Literature 2: JP Patent No. 4775380

SUMMARY OF THE INVENTION

Problem(s) to be Solved by the Invention

A music piece used by DJ or the like consists of several blocks (music structure feature sections), namely, A-verse (verse), B-verse (pre-chorus), hook (chorus) and the like. The music piece is developed by switching these blocks.

However, in the above technique of Patent Literature 1, while beat position information is obtained as music piece information, it is difficult to analyze development of the music piece, in other words, a switch of blocks (e.g., verse) of the music piece since the beat position information is provided as a single piece of information throughout the whole music piece.

In the above technique of Patent Literature 2, a section (e.g., beats and bars) of a music piece is not detected, so that the music piece is not segmented and the development (e.g., verse) of the music piece cannot be suitably detected. Further, a processing such as similarity judgement of the segments is complicated, which requires a high-performance computer system in order to finish analyzing in a short time. For this reason, it is difficult to compactly execute the processing at a high speed using a laptop personal computer for DJ performance.

Especially during DJ performance, it is required to select a new music piece one after another to be suited to an atmosphere of a dance floor and to get ready in a short time for a mixing standby condition A new music piece may be supplied via a network or a storage such as a USB memory. However, the technique of Patent Literature 2 requiring a long processing time cannot analyze new music pieces supplied at any time via the above means.

An object of the invention is to provide a music piece development analyzer configured to detect a development change-point of a music piece with a low processing load, a music piece development analysis method, and a music piece development analysis program.

Means for Solving the Problem(s)

According to an aspect of the invention, a music piece development analyzer includes: a comparison target sound detector configured to detect a sound production position of a comparison target sound in a form of a sound of a predetermined musical instrument from music piece data; a sound production pattern comparing unit configured to set at least two comparison sections each having a predetermined length in the music piece data, mutually compare the at least two comparison sections in terms of a sound production pattern of the comparison target sound, and detect a similarity degree of the sound production pattern between the at least two comparison sections; and a development change-point determining unit configured to determine a development change-point of the music piece data based on the similarity degree.

According to another aspect of the invention, a music piece development analysis method includes: detecting a sound production position of a predetermined comparison target sound from music piece data; setting two comparison sections each having a predetermined length at different positions in the music piece data, comparing the two comparison sections in terms of a sound production pattern of the comparison target sound, and detecting a similarity degree of the sound production pattern between the two comparison sections; and determining a development change-point of the music piece data based on the similarity degree.

According to still another aspect of the invention, a music piece development analysis program configured to instruct a computer to function as the music piece development analyzer according to the above aspect of the invention.

BRIEF DESCRIPTION OF DRAWING(S)

Figure 4:
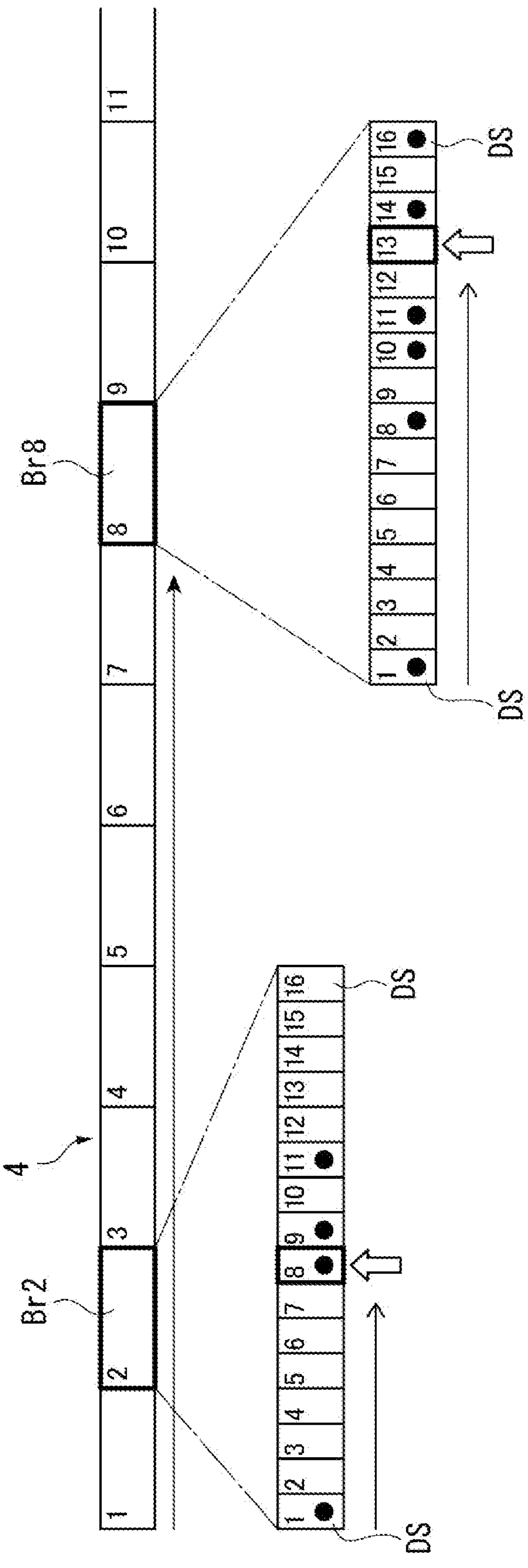

FIG. 4 schematically illustrates an operation for the comparison target detection in the above exemplary embodiment.

Figure 5:
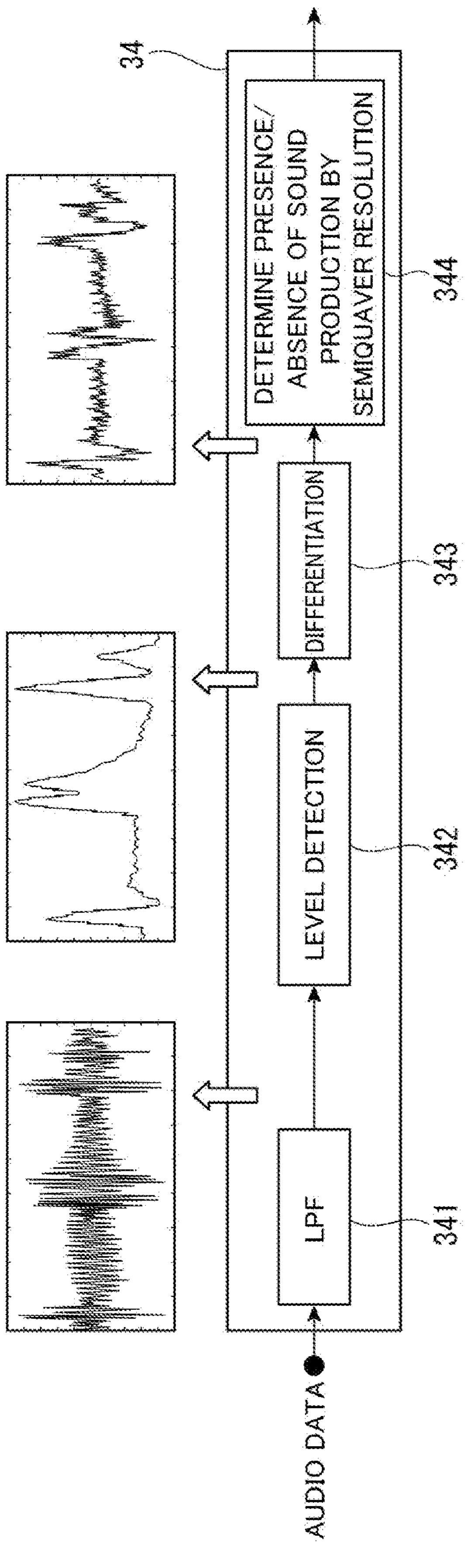

FIG. 5 is a block diagram showing a configuration applicable to the comparison target detection in the above exemplary embodiment.

Figure 6:
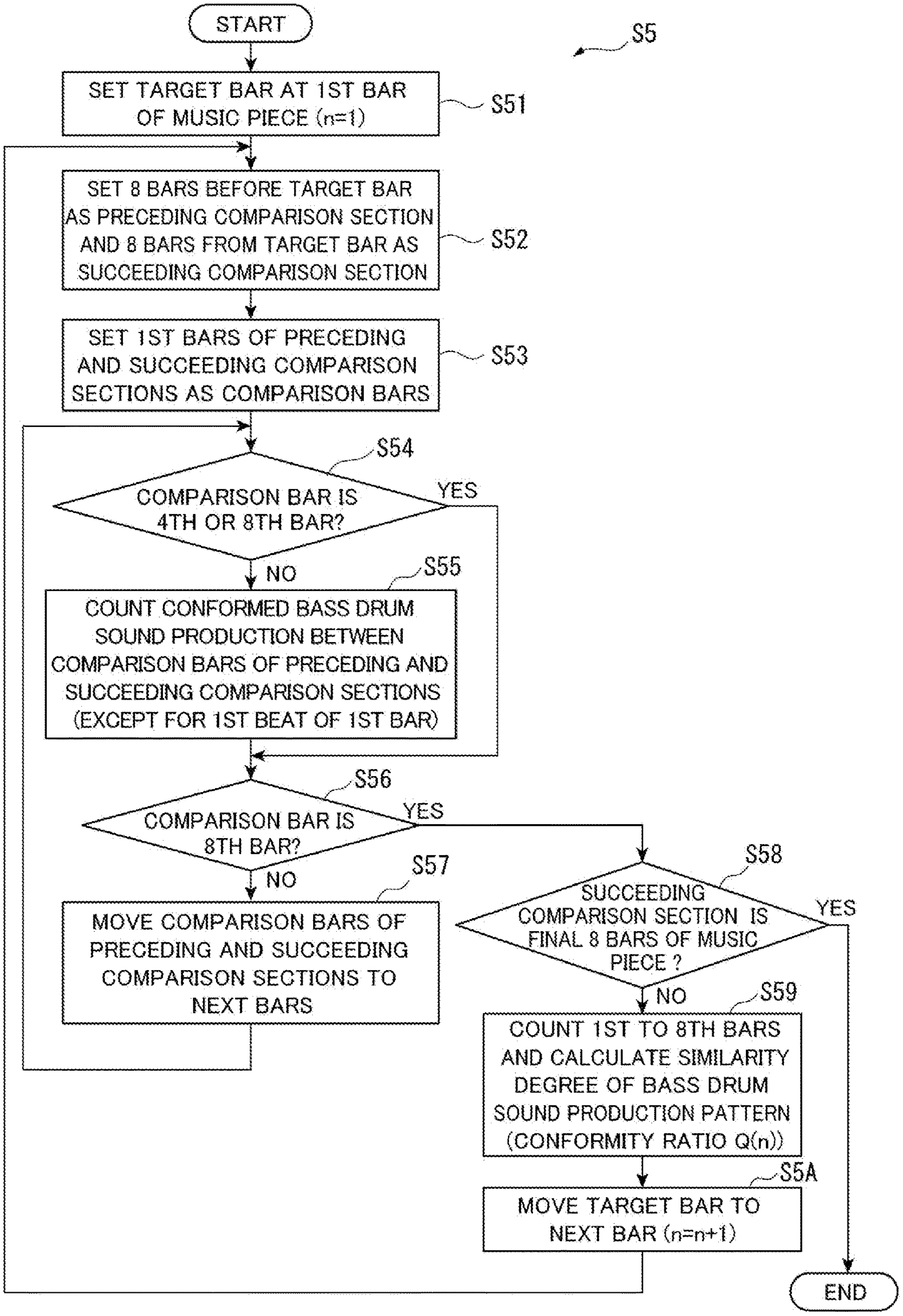

FIG. 6 is a flow chart showing sound production pattern comparison in the above exemplary embodiment.

Figure 7:
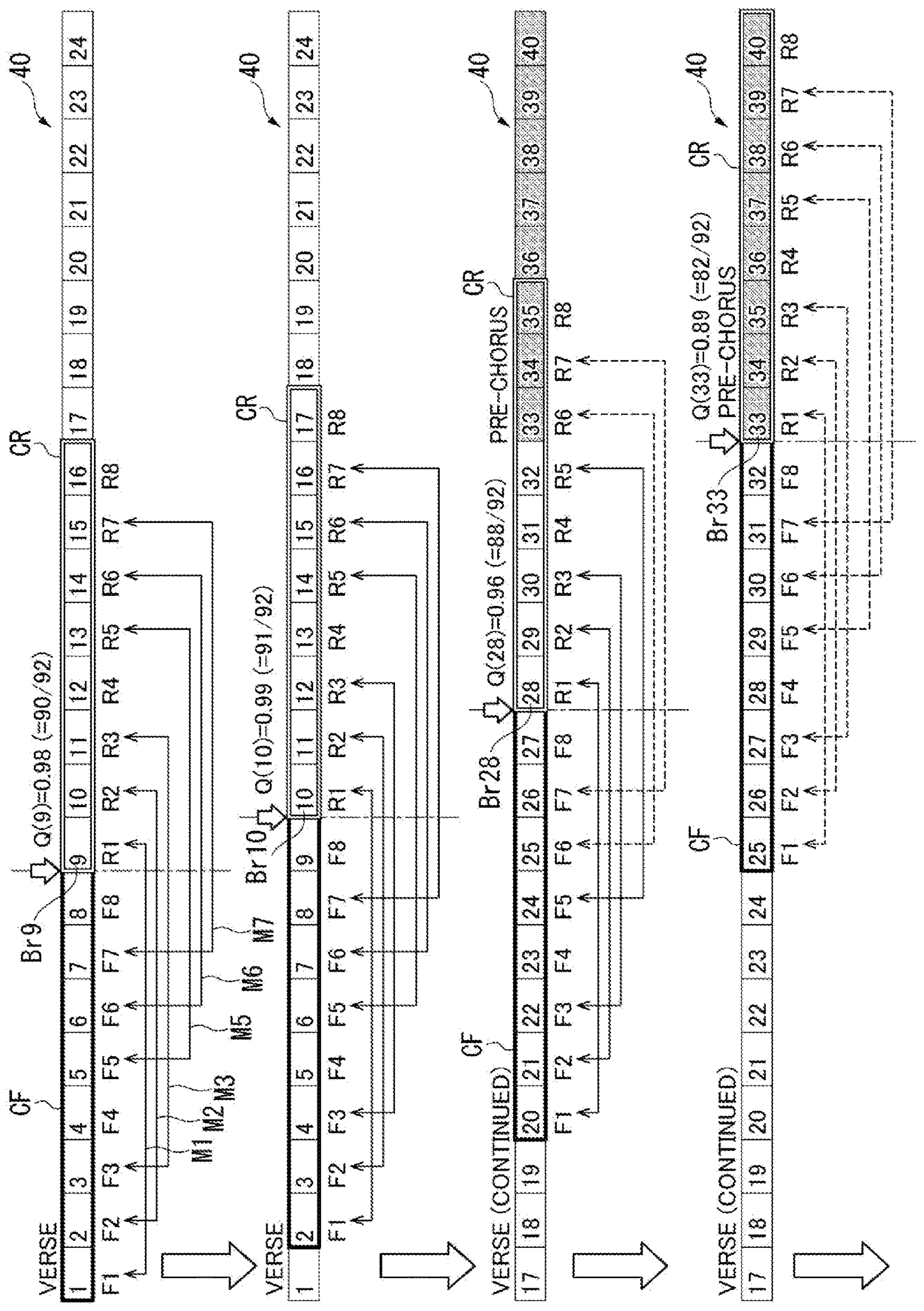

FIG. 7 schematically illustrates an operation for the sound production pattern comparison in the above exemplary embodiment.

Figure 8:
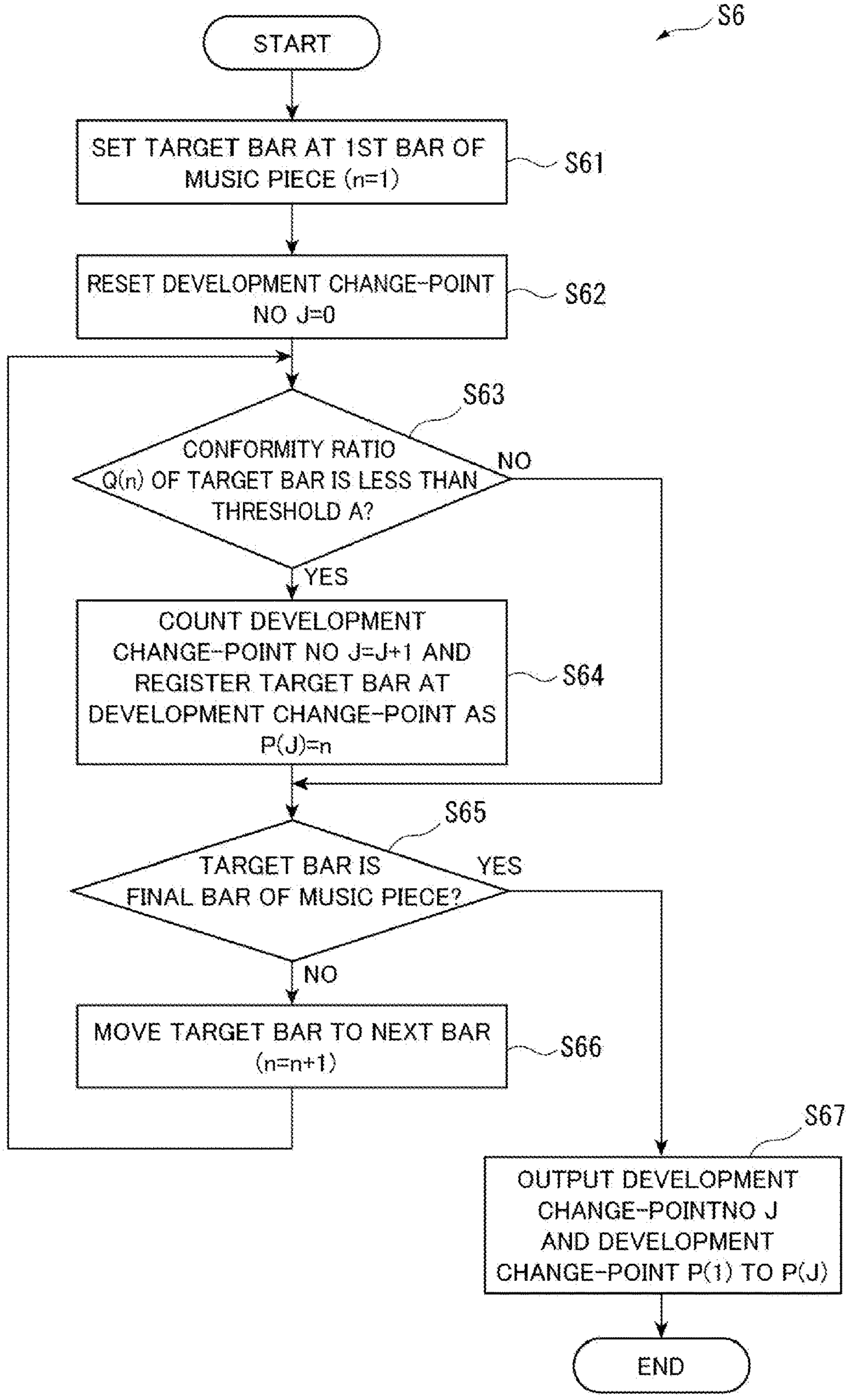

FIG. 8 is a flow chart showing a development change-point determining step in the above exemplary embodiment.

FIG. 9 schematically illustrates an operation for the development change-point determining step in the above exemplary embodiment.

DESCRIPTION OF EMBODIMENT(S)

An exemplary embodiment of the invention will be described below with reference to the attached drawings.

Music Piece Development Analyzer

Figure 1:
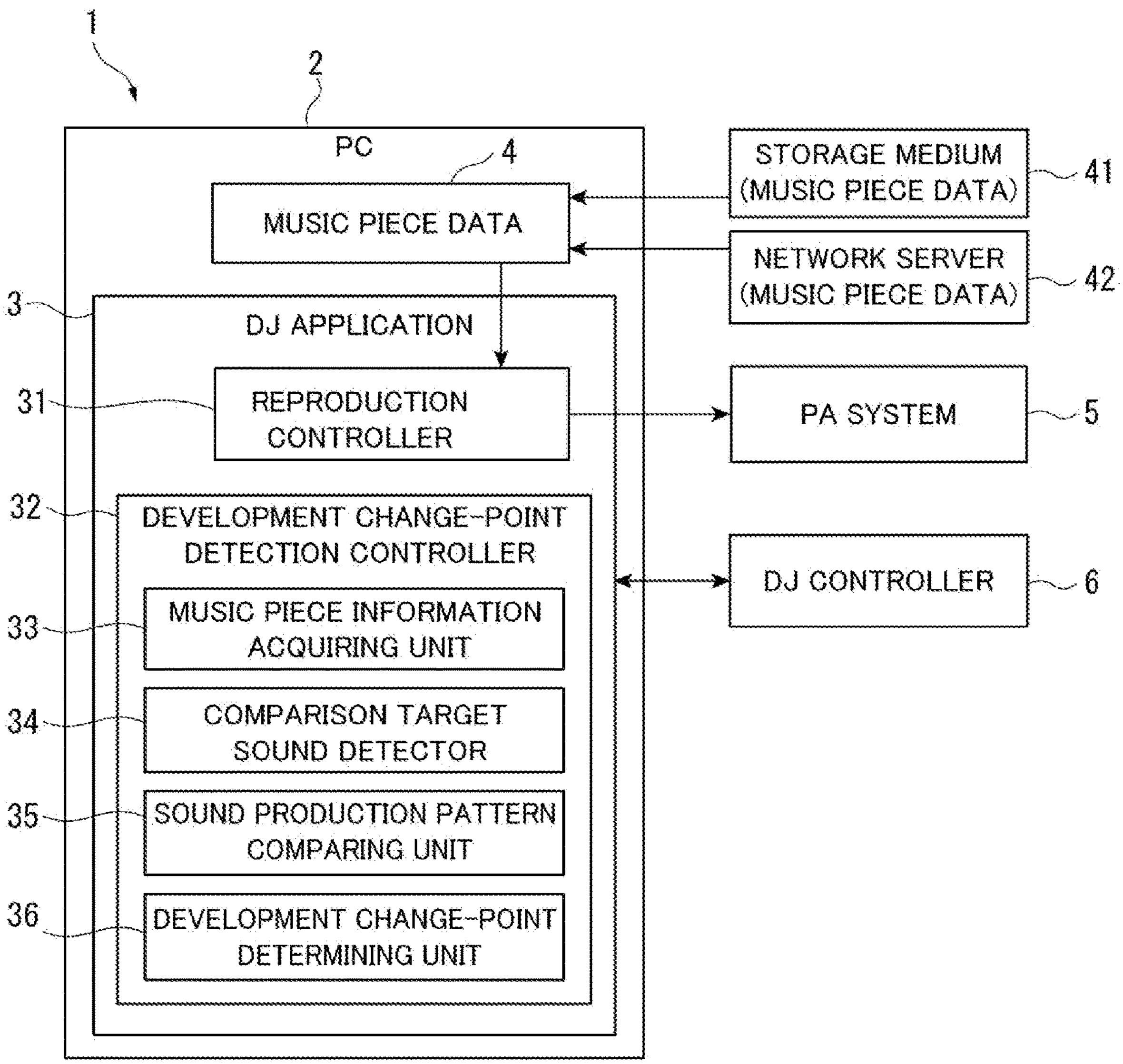
FIG. 1 is a block diagram showing a configuration of a music piece development analyzer according to an exemplary embodiment of the invention.

FIG. 1 shows a music piece development analyzer 1 according to the exemplary embodiment of the invention.

The music piece development analyzer 1 is a PCDJ system (Personal Computer based Disk Jockey system) configured to run a DJ application 3 on a personal computer 2.

The personal computer 2 is provided with a typical display, keyboard, and pointing device. A user can operate the personal computer 2 as desired.

The DJ application 3 reads music piece data 4 stored in the personal computer 2 and transmits an audio signal to a PA system 5 to reproduce a music piece.

By operating a DJ controller 6 connected to the personal computer 2, the user can run the DJ application 3 to apply various special operations and an effect processing to the music piece reproduced based on the music piece data 4.

The music piece data 4 to be reproduced by the DJ application 3 is not limited to the data stored in the personal computer 2 but may be data read from an external device via a storage medium 41 or may be data supplied via a network from a network server 42 connected to the personal computer 2.

When the DJ application 3 is run on the personal computer 2, a reproduction controller 31 configured to reproduce the music piece data 4 and a development change-point detection controller 32 are provided.

A reproduction controller 31 is configured to reproduce the music piece data 4 as a music piece and, when the reproduction controller 31 is operated with the DJ controller 6, to apply the processing corresponding to the above operation by the DJ controller 6 to the produced music piece.

The development change-point detection controller 32 is configured to detect a development change-point (e.g., a point where verse is changed to pre-chorus) of the music piece data 4. For instance, when the user wants to skip pre-chorus and reproduce chorus during reproduction of verse, the user can easily shift the reproduction from the verse to a beginning of the chorus by operating the reproduction controller 31 with the DJ controller 6 with reference to the development change-point detected by the development change-point detection controller 32.

In order to detect the development change-point, the development change-point detection controller 32 includes a music piece information acquiring unit 33, a comparison target sound detector 34, a sound production pattern comparing unit 35, and a development change-point determining unit 36.

The music piece information acquiring unit 33 is configured to perform a music piece analysis on the selected music piece data 4 and acquire beat position information and bar position information of the music piece data 4. The beat position information is detectable according to an existing music piece analysis in which a sound of a specific musical instrument is detected. The bar position information can be calculated from the beat position information, provided that, for instance, the music piece is set to be quadruple as a typical music piece handled by DJ. The music piece information acquiring unit 33 can be provided based on an existing music piece analysis technique (e.g., the above-described Patent Literature 1).

The comparison target sound detector 34 is configured to detect a sound production position of a predetermined comparison target sound from the music piece data 4 and record the sound production position as a point on a time axis of the music piece data 4 (see the later-described comparison target sound detection step S4 for details).

The sound production pattern comparing unit 35 is configured to set two comparison sections each having a predetermined length at different positions of the music piece data 4, compare the two comparison sections in terms of a sound production pattern of a comparison target sound, and detect a similarity degree of the sound production pattern between the two comparison sections (see the later-described sound production pattern comparison step S5 for details).

The development change-point determining unit 36 is configured to determine a development change-point in the music piece data 4 based on the similarity degree and output all the development change-points of the music piece data 4 (see the later-described development change-point determining step S6 for details). The obtained development change-points respectively correspond to the beginnings of the verse, pre-chorus, chorus and the like of the music piece and can be referred to as development elements of the music piece.

Music Piece Development Analysis Method

Figure 2:
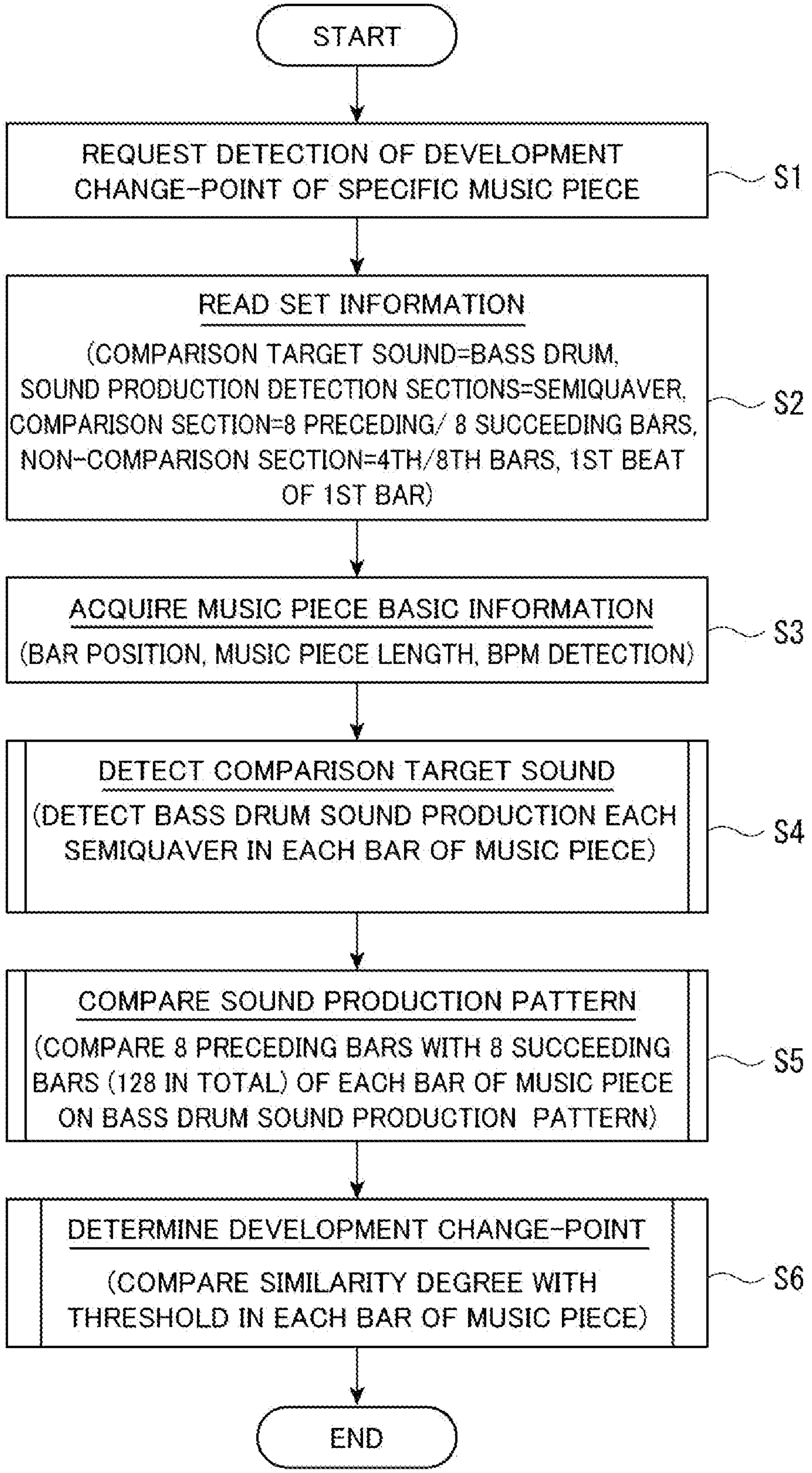
FIG. 2 is a flow chart showing an operation for detecting a development change-point in the above exemplary embodiment.

FIG. 2 shows a detection procedure of the music piece development change-points by the music piece development analyzer 1.

The music piece development change-point in the exemplary embodiment is started when the user specifies the target music piece data 4 and makes a detection request S1 of the development change-points.

In response to the operation by the user, the DJ application 3 is run to sequentially perform a set information reading step S2, a music piece basic information acquiring step S3, a comparison target sound detecting step S4, a sound production pattern comparing step S5, and a development change-point determining step S6, thereby detecting the music piece development change-points of the music piece data 4.

For the detection of the music piece development change-points, the development change-point detection controller 32 executes the set information reading step S2 to read the set information to be referred to in the later comparison target sound detecting step S4, sound production pattern comparing step S5, and development change-point determining step S6.

Examples of the set information include a comparison target sound (e.g., a bass drum in the exemplary embodiment), a sound production detection section (a semiquaver in the exemplary embodiment), comparison sections (eight preceding bars and eight succeeding bars in the exemplary embodiment), non-comparison section (the fourth bar, the eighth bar and the first beat of the first bar).

The music piece information acquiring unit 33 executes the music piece basic information acquiring step S3 to apply a music piece analysis to the music piece data 4 specified by the user and acquire bar positions, a music length (the number of the bar) and BPM of the music piece data 4. An existing music piece analysis technique (e.g., the above-described Patent Literature 1) is applicable to a specific procedure of the music piece basic information acquiring step S3.

Comparison Target Sound Detecting Step

Figure 3:
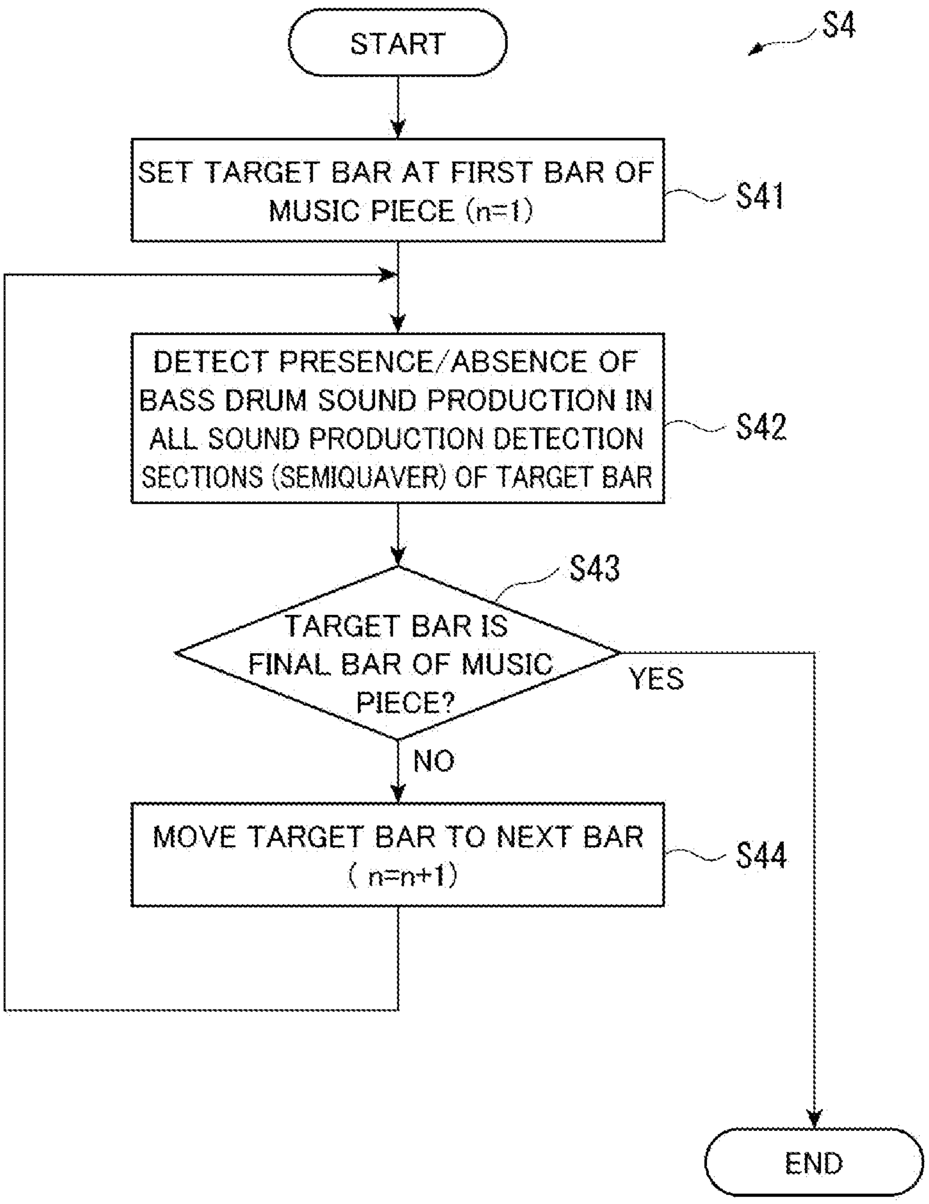
FIG. 3 is a flow chart showing comparison target detection in the above exemplary embodiment.

The comparison target sound detector 34 executes the comparison target sound detecting step S4 to detect sound production positions of the bass drum (i.e., comparison target sound) in all the bars (i.e., target bars) of the music piece data 4, according to the procedure shown in FIG. 3.

As shown in FIG. 3, in the comparison target sound detecting step S4, the first bar of the music piece data 4 is initially set as the target bar for detecting a sound production of the bass drum (also referred to as the bass drum sound production) (Step S41). Presence or absence of the bass drum sound production is detected in all the sound production detection sections (i.e., 16 semiquavers) of the target bar (Step S42). Subsequently, after it is judged whether the target bar is the final bar in the music piece (Step S43), the next bar is set as the target bar (Step S44) and Step S42 to Step S44 are repeated.

When the target bar is judged as the final bar in Step S43, since all the bars of the music piece data 4 have been subjected to the detection of the bass drum sound production, the comparison target sound detecting step S4 ends.

By the comparison target sound detecting step S4, pattern data showing the bass drum sound production is recorded for all the bars of the music piece data 4.

As shown in FIG. 4, in the second bar Br2 of the music piece data 4, 16 detection sections Ds (unit: semiquaver) are sequentially subjected to the detection of the bass drum sound production, so that it is recorded that the bass drum sound production is present (as displayed by a black filled circle in FIG. 4) in the 1st, 8th, 9th and 11th detection sections Ds. Likewise, in the eighth bar Br8 of the music piece data 4, it is recorded that the bass drum sound production is present in the 1st, 8th, 10th, 11th, 14th, and 16th detection sections.

As the configuration (i.e., the comparison target sound detector 34) of detecting presence or absence of the bass drum sound production in the comparison target sound detecting step S4, for instance, the following configuration is usable.

As shown in FIG. 5, the comparison target sound detector 34 captures audio data of the music piece data 4, extracts low notes with a low-pass filter 341 from the audio data, and then subjects the low notes to level detection 342 using an absolute value calculation and the low-pass filter. Further, the comparison target sound detector 34 subjects the obtained data to a differentiation circuit 343 to perform a sound production judgement 324 of whether a peak recognizable as the bass drum sound production is present in the detection sections each defined by a semiquaver (resolutions), so that presence or absence of the bass drum sound production in the detection sections is detectable.

The comparison target sound may be a sound of other percussive musical instruments (e.g., a snare drum), may be a sound of other musical instruments for beating out rhythm besides the drum set, may be a sound of other musical instruments for playing a clear rhythm, or may be an audio signal emitted from a device other than the musical instruments. The detection section is not necessarily defined by the semiquaver as the unit, but may be defined by another note such as a demisemiquaver or a quaver as the unit.

Sound Production Pattern Comparing Step

The sound production pattern comparing unit 35 executes the sound production pattern comparing step S5 according to the procedure shown in FIG. 6. The sound production pattern comparing step S5 includes: setting two comparison sections (e.g., eight preceding bars and eight succeeding bars of the target bar, the preceding bars abutting on the succeeding bars) each having a predetermined length, the two comparison sections being provided at different positions in the music piece data 4; comparing corresponding bars (comparison bars) in the two comparison sections in terms of the sound production pattern (detected in the comparison target sound detecting step S4) of the comparison target sound; and detecting the similarity degree of the sound production pattern between the two comparison sections.

While the target bar is sequentially shifted, the detection of the similarity degree is performed on all the bars of the music piece data 4 (actually except for the beginning eight bars and the ending eight bars of the music piece).

The beginning eight bars and the ending eight bars of the music piece are excluded since the eight bars for defining a preceding comparison section or a succeeding comparison section are not obtainable in each of the beginning eight bars and the ending eight bars.

As shown in FIG. 6, in the sound production pattern comparing step S5, the target bar is initially set at the first bar (n=1) of the music piece (Step S51). Eight bars preceding the target bar is set as the preceding comparison section and eight bars starting from the target bar (in which the first bar is the target bar) is set as the succeeding comparison section (Step S52).

Next, the first bar of the preceding comparison section and the first bar of the succeeding comparison section are set as the comparison bars (Step S53), and the respective sound production patterns of the comparison bars in the preceding comparison section and the succeeding comparison section are compared.

In the comparison between the sound production patterns, it is checked whether the comparison bars are neither the fourth bar nor the eighth bar that are designated as the non-comparison sections (Step S54). Only when the comparison bars are neither the fourth bar nor the eighth bar, the comparison is performed (Step S55). Moreover, in Step S55, when each of the comparison bars is the first bar, the first beat thereof designated as the non-comparison section is excluded from the comparison of a sound production pattern.

This is because a lot of irregular sounds (e.g., fill-in of a drum) are generally produced in the fourth bar and the eighth bar and are not suitable for comparing the sound production pattern. Moreover, following the fill-in in the preceding bar, an irregular sound may be produced at the first beat of the first bar, which is also not suitable for comparing the sound production pattern.

By designating the fourth bar, the eighth bar and the first beat of the first bar as the non-comparison sections to exclude from the sound production pattern comparison, an accuracy of the comparison result is improvable. It should be noted that, as for the beat to be excluded, the first beat of the fifth bar may be further excluded.

FIG. 7 schematically illustrates a sound production pattern comparison processing in the sound production pattern comparing step S5.

In the top row of FIG. 7, the ninth bar Br9 of the music piece data 4 is set as each of the comparison bars, a preceding comparison section CF is set as ranging from the first bar to the eighth bar of the music piece data 4, and a succeeding comparison section CR is set as ranging from the ninth bar to the 16th bar of the music piece data 4.

The comparison of the comparison bars is conducted as follows. Firstly, the first bar F1 (the first bar of the music piece data 4) of the preceding comparison section CF is compared with the first bar R1 (the ninth bar of the music piece data 4) of the succeeding comparison section CR. Specifically, 16 detection sections of the sound production pattern recorded for the first bar F1 are compared with those recorded for the first bar R1, and a conformity number M1 of the detection sections is counted, the conformity number M1 representing that presence or absence of the bass drum sound production is in conformity between the detection sections (i.e., the bass drum sound production is present or absent in both of the detection section of the first bar F1 and the detection section of the first bar R1).

Subsequently, the second bar F2 (the second bar of the music piece data 4) in the preceding comparison section CF is compared with the second bar R2 (the tenth bar of the music piece data 4) in the succeeding comparison section CR, and a conformity number M2 is recorded. Subsequently, the comparison between the third bars F3 and R3 and between the fifth bars F5 and R5 are made in the same manner as the above and repeated until the comparison between the seventh bars F7 and R7 is made. The conformity numbers M1 to M3 and M5 to M7 in the corresponding comparison sections are obtained. The total of the conformity numbers M1 to M3 and M5 to M7 is recorded as a conformity number M(n) of a current target bar (n represents a bar number of the current target bar).

Referring back to FIG. 6, subsequent to Step S55, after it is judged whether each of the comparison bars in the comparison sections is the eighth bar (Step S56), the next bar is set as the comparison bar (Step S57) and Steps S54 to S57 are repeated.

When the current comparison bars are each judged as the eighth bar of the comparison sections in Step S56, it means the end of the comparison of the sound production pattern between the preceding eight bars and the succeeding eight bars with respect to the current target bar. Subsequently, after it is judged whether the succeeding comparison section is the last eight bars of the music piece (Step S58), a similarity ratio is calculated (Step S59). In Step S59, as the similarity ratio of the current target bar, a conformity ratio Q(n) of the previously counted conformity number of the detection sections to the preceding and succeeding comparison sections in the sound production pattern is calculated. After Step S59, the next bar (the first bar is followed by the second bar of the music piece data 4, and subsequent bars are followed in the same manner) is set as the target bar (Step S5A). Steps S52 to S5A are repeated until it is judged in Step S58 that the processing reaches the end of the music piece data 4.

The sound production pattern comparing step S5 provides the conformity ratio Q(n) of the sound production pattern between the preceding and succeeding comparison sections (each having eight bars) for each of the bars of the music piece data 4.

Herein, the conformity number M(n), which is a base of the conformity ratio Q(n), is calculated as the total of the conformity numbers M1 to M3 and M5 to M7 in the first to third bars and the fifth to seventh bars of the comparison sections.

With respect to each of the conformity numbers M2, M3, and M5 to M7 in the second, third, and fifth to seventh bars among the conformity numbers, the maximum conformity number is 16 that is equal to the number of the detection sections in each of the bars. However, since the first beat of the first bar is excluded, a conformity number M1 of the first bar is 12 by calculation of subtracting the first beat (i.e., four sections) from 16. Accordingly, the maximum value of the conformity number M(n) in a single set of the comparison sections is equal to 92. A value obtained by dividing the total of the counted conformity numbers M1 to M3 and M5 to M7 by the maximum value 92 is the conformity ratio Q(n) (n represents the bar number of the current target bar) for the current comparison bars.

For instance, when the ninth bar Br9 of the music piece data 4 is the target bar (in the top row of FIG. 7), when the conformity number M(9) is 90 in Step S55, the conformity ratio Q(9)=90/92=0.98.

When the target bar and the preceding and succeeding comparison sections are redefined, the target bar is the tenth bar Br10 of the music piece data 4 (at the second row of FIG. 7), the first bar F1 to the eighth bar F8 of the preceding comparison section CF are the second bar to the ninth bar of the music piece data 4, and the first bar R1 to the eighth bar R8 of the succeeding comparison section CR is the tenth bar to the 17th bar of the music piece data 4.

When the conformity number M(10) with respect to the tenth bar Br10 is 91, the conformity ratio Q(10)=91/92=0.99.

When the target bar and the preceding and succeeding comparison sections are further redefined, the target bar is the 28th bar Br28 of the music piece data 4 (at the third row of FIG. 7), the first bar F1 to the eighth bar F8 of the preceding comparison section CF are the 20th bar to the 27th bar of the music piece data 4, and the first bar R1 to the eighth bar R8 of the succeeding comparison section CR are the 28th bar to the 35th bar of the music piece data 4.

Herein, it is assumed that the first bar to the 32nd bar belong to verse, and the 33rd and subsequent bars belong to pre-chorus in the music piece data 4. With respect to the ninth bar (in the top row of FIG. 7) and the tenth bar (in the second row of FIG. 7) whose comparison sections both belong to verse, the conformity ratios Q(9) and Q(10) are as high as 0.98 or more.

However, at the 28th bar (in the third row of FIG. 7), only the sixth bar R6 to the eighth bar R8 of the succeeding comparison section CR belong to pre-chorus, thereby increasing a difference in the sound production pattern with respect to the corresponding bars F6 to F8 of the preceding comparison section. Accordingly, the conformity number M(28) in the 28th bar Br28 is 88, which is much smaller than, for instance, the above-described M(9) and M(10), and the conformity ratio Q(28)=88/92=0.96.

Further, when the target bar is the 33rd bar Br33 of the music piece data 4 (at the bottom row of FIG. 7), the first bar F1 to the eighth bar F8 of the preceding comparison section CF are the 25th bar to 32nd bar of the music piece data 4, and the first bar R1 to the eighth bar R8 of the succeeding comparison section CR are the 33rd bar to 40th bar of the music piece data 4.

In this condition, all the comparison bars in one of the comparison sections belong to verse, whereas all the comparison bars in the other of the comparison sections belong to pre-chorus. For instance, with respect to the 33rd bar Br33, the conformity number M(33)=82 and conformity ratio Q(33)=82/92=0.89 are obtained.

As described above, the development change-point between verse and pre-chorus can be determined by calculating the conformity ratio Q(n) of each bar obtained in the sound production pattern comparing step S5. The development change-point is determined according to the following development change-point determining step S6.

Development Change-Point Determining Step

The development change-point determining unit 36 executes the development change-point determining step S6 to determine the development change-point of the music piece data 4 based on the similarity degree and output all the development change-points of the music piece data 4, according to the procedure shown in FIG. 8.

The obtained development change-points respectively correspond to the beginnings of the verse, pre-chorus, chorus and the like of the music piece and can be referred to as development elements of the music piece.

As shown in FIG. 8, in the development change-point determining step S6, the target bar is initially set as the first bar (n=1) of the music piece (Step S61). Moreover, the count number of the development change-point is reset, specifically, at the development change-point number J=0 (Step S62).

Next, it is checked whether the conformity ratio Q(n) of the target bar is less than a preset threshold A (Step S63). When the conformity ratio Q(n) of the target bar is less than the threshold A, the development change-point is registered (Step S64).

In Step S64, the development change-point number J is counted and the target bar is registered in a development change-point list. The development change-point list is registered in a form of the development change-point P(J)=n (which represents the J-th development change-point P(J) is n).

It should be noted that a plurality of continuous bars may be detected as the development change-point depending on the setting of the threshold A. In such a case, as the bar to be registered, a bar having the minimum conformity ratio Q(n) among the plurality of continuous bars (candidates of the development change-point) can be selected.

Alternatively, instead of detecting with the threshold A, a bar having the minimum conformity ratio Q(n) among a plurality of bars in a predetermined section may be selected.

Subsequently, after it is judged whether the target bar is the final bar in the music piece (Step S65). the next bar is defined as the target bar (Step S66) and Step S63 to Step S66 are repeated.

When the final bar is detected in Step S65, the count of the development change-point number J and the list of the development change-points P(1) to P(J) are recorded or outputted (Step S67) to end the development change-point determining step S6.

FIG. 9 schematically illustrates a development change-point determination in the development change-point determining step S6.

As shown in FIG. 9, the top row is from the first bar (n=1) to the 16th bar (n=16) of the music piece, in which the conformity ratios Q(n) are recorded except for the non-comparison bars that is a part of the first bar to the 16th bar. In the second row, the 17th to 32nd bars (n=17 to 32) of the music piece and the respective conformity ratios Q(n) are provided. Likewise, the 33rd bar to the 80th bar are provided such that 16 bars are arranged in each of the third to fifth rows.

Herein, it is assumed that the first bar to the 32nd bar belong to verse, the 33rd bar to the 48th bar belong to pre-chorus, and the 49th bar to the 80th bar belong to verse in the music piece.

In the development change-point determining step S6, the threshold A=0.90 is set in advance and the conformity ratio Q(n) of each bar is sequentially checked.

In the top row and the 27th bar and the preceding bars in the second row, since the preceding comparison section and the succeeding comparison section in the sound production pattern comparing step S5 both belong to verse, the conformity ratio Q(n) is approximately constant at 0.98 or more.

However, at the 29th and subsequent bars in the second row, a part of the bars of the succeeding comparison section belong to pre-chorus. Accordingly, the conformity ratio Q(n) of the succeeding comparison section relative to the preceding comparison section belonging to verse is decreased. The 33rd bar (n=33) shows the conformity ratio Q(33)=0.89, which is lower than the threshold A=0.90. As a result, in Step S64, the 33rd bar is detected as the first (J=1) development change-point P(1)=33.

Subsequent to the the 33rd bar, the preceding comparison section also belongs to pre-chorus. At the 34th and subsequent bars, the conformity ratio Q(n) is increased. When the target bar ranges from the 39th to 43rd bars, the conformity ratio Q(n) of 0.98 or more is recovered since most of the bars in the preceding and succeeding comparison sections belong to pre-chorus.

However, at the 45th and subsequent bars, the conformity ratio Q(n) is decreased since the succeeding comparison section belong to verse. The 49th bar (n=49) shows the conformity ratio Q(49)=0.89 lower than the threshold A=0.90. As a result, in Step S64, the 49th bar is detected as the second (J=2) development change-point P(2)=49.

When the threshold A=0.92 is set, the 33rd to the 34th bars and 49th to 50th bars continuously show the conformity ratio Q(n) lower than the threshold A. In such a case, it is only necessary to select the bar (the 33rd bar and the 49th bar) showing the lower conformity ratio in each of the continuous sections.

As described above, in the development change-point determining step S6, presence of two development change-points (i.e., the development change-point P(1)=33 and the development change-point P(2)=49) at the development change-point number J=2 are detected in the first bar to the 80th bar of the music piece.

As described above, the 33rd bar is the beginning bar of the pre-chorus and the 49th bar is the beginning bar returning to the verse. Both of the 33rd bar and the 49th bar are development change-points. Thus, the development change-point determining step S6 can determine a change between the verse and the pre-chorus of the music piece as the development change-point.

Advantage(s) of Embodiment(s)

According to the music piece development analyzer 1 of the exemplary embodiment, the user designates the target music piece data 4 and starts a series of the detection procedure of the music piece development change-point, so that a change in sections (e.g., the verse and the pre-chorus) of the music piece can be detected as the development change-point.

The music piece development analyzer 1 executes the detection procedure of the music piece development change-point, the detection procedure including the set information reading step S2, the music piece basic information acquiring step S3, the comparison target sound detecting step S4, the sound production pattern comparing step S5, and development change-point determining step S6. No complicated pattern recognition is used in the above steps S2 to S6.

Especially, in the sound production pattern comparing step S5, a change point of the development (e.g., verse, pre-chorus, and chorus) in the music piece can be analyzed by comparing the bass drum sound production patterns between the eight preceding bars and the eight succeeding bars without conducting a complicated pattern recognition processing.

Accordingly, the personal computer 2 to be used as the music piece development analyzer 1 is not required to have an excessively high performance. Even the personal computer 2 having a standard performance can offer a sufficient processing speed.

Due to a fast processing speed, the music piece development analyzer 1 is usable with no stress for detecting the development change-point in real time at a site such as DJ events.

For instance, when the user wants to skip pre-chorus and reproduce chorus while verse is being reproduced, the user can easily shift the reproduction from the verse to a beginning of the chorus by detecting the development change-point with the development change-point determining unit 36 and operating the reproduction controller 31 with the DJ controller 6.

When a music piece being reproduced is changed to a different music piece while mixing the music pieces with cross-fade, it is a standard procedure to start mixing from an apparent change point in the development. Typically, DJ needs to manually prepare for such an operation. In contrast, the invention is very useful since a start point for mixing can be automatically set.

Moreover, due to a low processing load, if DJ is requested a new music piece at a site, DJ can finish analysis in a short time and promptly respond to the request.

Other Embodiment(s)

It should be understood that the scope of the invention is not limited to the above-described exemplary embodiment but includes modifications and the like as long as the modifications and the like are compatible with the invention.

In the above exemplary embodiment, in the development change-point determining step S6, the development change-point determining unit 36 determines that the current target bar defines the development change-point when the conformity ratio Q(n), which is the similarity degree between the different comparison sections, is lower than a predetermined threshold A. However, instead of detecting with the threshold A, a bar having the minimum conformity ratio Q(n) among a plurality of bars in a predetermined section is selected in some embodiments.

However, by using the predetermined threshold A, the target bars having the conformity ratio Q(n) equal to or more than threshold A can be excluded from the candidates of the development change-point, so that the processing can be simply conducted at a high speed.

In the above exemplary embodiment, in the comparison target sound detecting step S4, the comparison target sound detector 34 detects presence or absence of the bass drum sound production (i.e., the comparison target sound) in the sound production detection sections each defined by the semiquaver. However, each of the sound production detection sections is defined by a quaver or a longer note, or defined by a demisemiquaver or a shorter note in some embodiments.

It should be noted that an excessively high accuracy is avoidable when each of the sound production detection sections is defined by a semiquaver. Since the semiquaver has a high affinity to recent music pieces, the semiquaver is suitable for detecting an appropriate development change-point.

In the above exemplary embodiment, in the sound production pattern comparing step S5, the sound production pattern comparing unit 35 compares the sound production pattern between two comparison sections (i.e., the preceding comparison section CF and the succeeding comparison section CR) adjacent (or continuous) to each other, and detects the similarity degree between two comparison sections. However, the two comparison sections CF and CR are spaced apart, in other words, interpose some bars therebetween in some embodiments.

For instance, when a development of a music piece is changed every 32 bars, the beginning eight bars among 32 bars is defined as the preceding comparison section while the beginning eight bars among next 32 bars is defined as the succeeding comparison section, and the preceding comparison section and the succeeding comparison section are mutually compared in terms of the sound production pattern in some embodiments.

Even when a development of a music piece is changed every 16 bars, presence or absence of a change in the development can be detected by comparing the beginning eight bars among 32 bars with the beginning eight bars among next 32 bars. When the change in the development is present, a detailed detection is further conducted to obtain a development change-point in some embodiments. By the above processing of excluding the target bars based on the predetermined value or skimming the target bars, the preceding comparison section and the succeeding comparison section can be mutually compared at a further high speed in terms of the sound production pattern.

On the other hand, since such a setting of the preceding comparison section and the succeeding comparison section as to partially overlap with each other tends to increase similarity in the comparison results, this setting is unsuitable for the sound production pattern comparison of the invention in which a decrease in similarity is to be detected.

In the above exemplary embodiment, the music piece development analyzer 1 is defined as a system for PCDJ and is configured to run the DJ application 3 on the personal computer 2. However, the music piece development analyzer 1 of the invention is software run by a dedicated device for DJ or is installed as hardware in a dedicated device for DJ in some embodiments. Further, the music piece development analyzer 1 of the invention is used not only as the system for DJ but also as a music piece analysis system and a music piece analysis for other purposes. For instance, the music piece development analyzer 1 is used for producing or editing a music piece or video contents in some embodiments.

The invention claimed is:

1. A music piece development analyzer comprising:

a comparison target sound detector configured to detect a sound production position of a comparison target sound in a form of a sound of a predetermined musical instrument from music piece data;

a sound production pattern comparing unit configured to set at least two comparison sections each having a predetermined length in the music piece data, mutually compare the at least two comparison sections in terms of a sound production pattern of the comparison target sound according to presence or absence of the comparison target sound, and detect a similarity degree of the sound production pattern between the at least two comparison sections; and a development change-point determining unit configured to determine a development change-point of the music piece data based on the similarity degree.

2. The music piece development analyzer according to claim 1, wherein the development change-point determining unit determines that the development change-point is present between the at least two comparison sections when the similarity degree between the at least two comparison sections is lower than a predetermined threshold.

3. The music piece development analyzer according to claim 1, further comprising:

a music piece information acquiring unit configured to acquire beat position information, wherein the comparison target sound detector is configured to divide each of the at least two comparison sections into sound production detection sections each defined by a semiquaver based on the beat position information, and detect presence or absence of the comparison target sound in each of the sound production detection sections.

4. The music piece development analyzer according to claim 1, wherein the at least two comparison sections comprises a first comparison section and a second comparison section, the first comparison section preceding and abutting on the second comparison section, and the sound production pattern comparing unit is configured to compare the sound production pattern of the first comparison section with the sound production pattern of the second comparison section, and detect the similarity degree.

5. The music piece development analyzer according to claim 1, further comprising:

a music piece information acquiring unit configured to acquire bar position information, wherein the sound production pattern comparing unit is configured to define a candidate of the development change-point at a change point between bars based on the bar position information, mutually compare the at least two comparison sections each defined by eight bars in terms of the sound production pattern, and detect the similarity degree of the sound production pattern between the at least two comparison sections.

6. The music piece development analyzer according to claim 5, wherein the sound production pattern comparing unit is configured to exclude a predetermined non-comparison section among the at least two comparison sections each defined by eight bars from comparing of the sound production pattern, and the predetermined non-comparison section is a fourth bar and an eighth bar of each of the at least two comparison sections.

7. The music piece development analyzer according to claim 5, wherein the sound production pattern comparing unit is configured to exclude a predetermined non-comparison section among the at least two comparison sections each defined by eight bars from comparing of the sound production pattern, and the predetermined non-comparison section is a first beat of a first bar of each of the at least two comparison sections.

8. The music piece development analyzer according to claim 1, wherein the comparison target sound is a sound of a musical instrument configured to beat out rhythm.

9. The music piece development analyzer according to claim 8, wherein the comparison target sound is a sound of a bass drum.

10. A music piece development analysis method comprising:

detecting a sound production position of a predetermined comparison target sound from music piece data;

setting two comparison sections each having a predetermined length at different positions in the music piece data, comparing the two comparison sections in terms of a sound production pattern of the comparison target sound according to presence or absence of the comparison target sound, and detecting a similarity degree of the sound production pattern between the two comparison sections; and determining a development change-point of the music piece data based on the similarity degree.

11. A medium storing a program code and being readable and executable by a computer, wherein the program code instructs the computer to function as the music piece development analyzer according to claim 1 when the program code is read and executed by the computer.

* * * * *